(12) United States Patent  (10) Patent No.: US 7,722,313 B1
Dilorio  (45) Date of Patent: May 25, 2010

(54) DEVICE FOR CONVERTING KINETIC ENERGY CONTAINED IN A FLUID, INTO MECHANICAL ENERGY

(76) Inventor: Crescencio Dilorio, Colectora 9874 de la Ciudad de Batan, Buenos Aires, BA (AR) 7601

( * ) Notice: Subject to any disclaimer, the term of this patent is extended or adjusted under 35 U.S.C. 154(b) by 596 days.

(21) Appl. No.: 11/609,737

(22) Filed: Dec. 12, 2006

(51) Int. Cl.
*F03B 3/00* (2006.01)
(52) U.S. Cl. .......................................... 415/80; 415/229
(58) Field of Classification Search .................. 415/80, 415/81, 82, 202, 208.2, 211.2, 229; 416/185
See application file for complete search history.

(56) References Cited

U.S. PATENT DOCUMENTS

| | | | |
|---|---|---|---|
| 1,173,130 A * | 2/1916 | Throckmorton | 416/118 |
| 2,013,455 A * | 9/1935 | Baxter | 415/218.1 |
| 2,844,100 A * | 7/1958 | Heinicke | 417/423.14 |
| 3,104,803 A * | 9/1963 | Flatt | 417/326 |
| 3,863,555 A * | 2/1975 | Duff et al. | 99/637 |
| 4,452,556 A * | 6/1984 | Nelson et al. | 411/377 |
| 4,660,390 A | 4/1987 | Worthington | |
| 4,892,138 A | 1/1990 | Bibik, Jr. | |
| 4,996,850 A | 3/1991 | Boxum et al. | |
| 5,512,788 A | 4/1996 | Berenda et al. | |
| 6,097,104 A | 8/2000 | Russell | |
| 6,365,985 B1 | 4/2002 | Cohen | |

FOREIGN PATENT DOCUMENTS

| | | |
|---|---|---|
| EP | 1108890 | 6/2001 |
| ES | 2000521 | 3/1988 |
| ES | 2100363 | 6/1997 |
| GB | 2173260 | 10/1986 |

* cited by examiner

*Primary Examiner*—Edward Look
*Assistant Examiner*—Ryan H Ellis
(74) *Attorney, Agent, or Firm*—Albert Bordas, P.A.

(57) ABSTRACT

Device for converting kinetic energy contained in a fluid, into mechanical energy, coupled to an either gaseous or liquid fluid mass outlet secondary conduit, constituted by a fixed main conduit receptor of said fluid mass and a movable conduit coaxially attached to an axial flow rotor and associated to an outer supporting frame, including this assembly a flange abutting with said fixed conduit; both conduits are assembled by a fitting device comprising a lid, sealing washers, bearings and retaining ring acting on spacing sleeves and a locking nut; the movable conduit attached to the rotor rotates along its axis and coaxial to said fixed conduit without a major axial displacement; within said rotor it is lodged a hub and a deflector capable of directing the fluid's flow toward passages within the hollow blades and their corresponding exits at the end of each blade, constituting each one of said exit outlets an ejector means for the fluid, thereby achieving the rotational movement of the rotor on its axis; attached to said rotor there is a driven shaft with coupling means to the shaft of the driven means, such as an electrical generator.

15 Claims, 4 Drawing Sheets

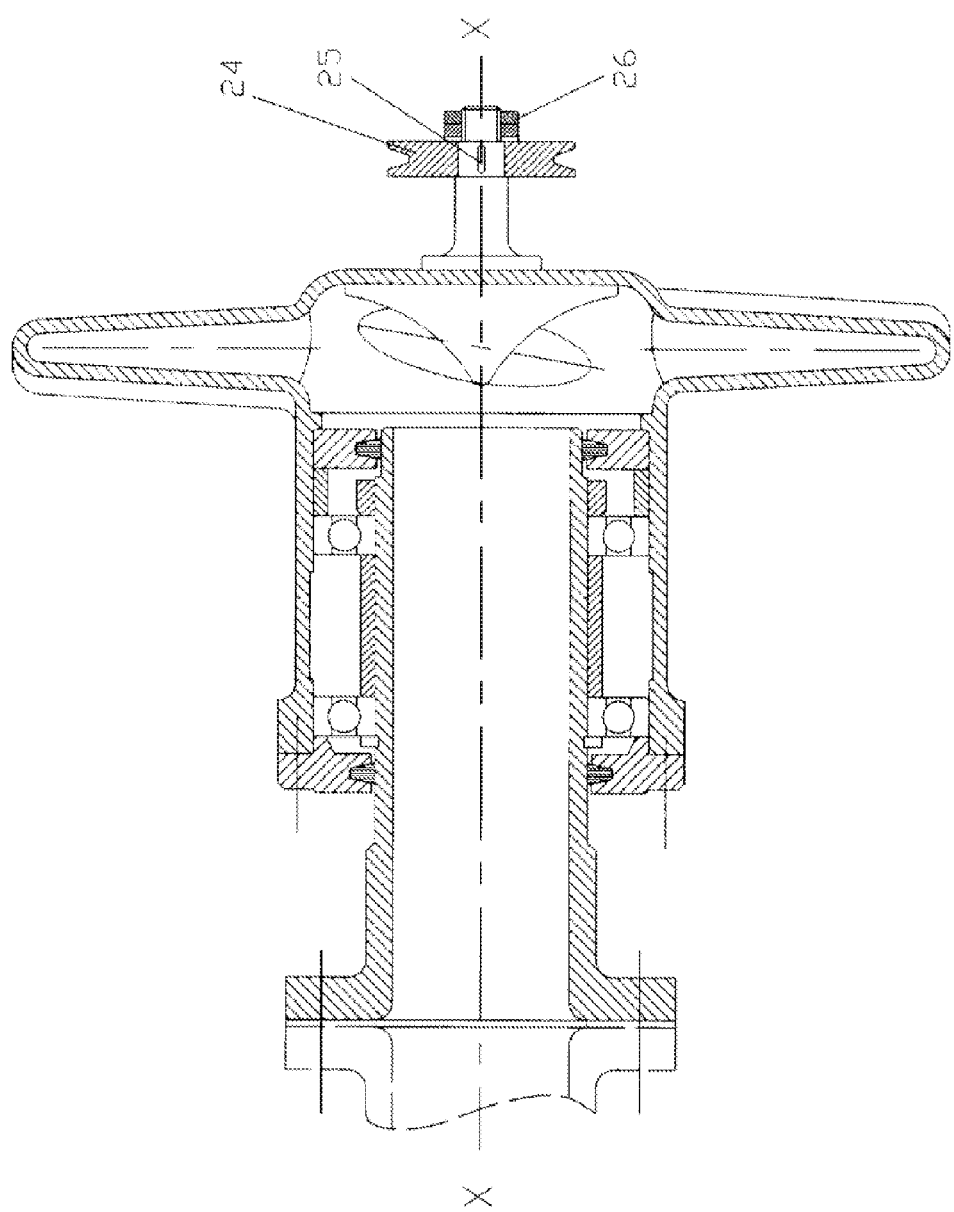

DEVICE FOR CONVERTING KINETIC ENERGY CONTAINED IN A FLUID, INTO MECHANICAL ENERGY

FIELD OF THE INVENTION

This instant invention corresponds to a device converting kinetic energy carried by a fluid, into mechanical energy. This device is constituted by a combination of structural elements operatively related the one with the others with the purpose of obtaining a device capable of generating a high yield output of mechanical or electric power.

BACKGROUND OF THE INVENTION

There are known in the art several published patents teaching devices, mechanisms or the like which are introduced herewith as prior art of this instant invention, owing their importance to their capability of generating driving power (either mechanical or electrical), according to the following mentions:

U.S. Pat. No. 6,365,98581 teaches a turbine and an electrical generator coupled to the former and placed at the outlet of an air conditioning equipment, taking the mass of outgoing air from said air conditioner as its mass of air input producing the rotating movement of said turbine.

U.K. Patent GB 2.173.260 shows a radial flow turbine and associated devices applied to the outlet of the exhaust of a vehicle's engine.

Spanish Patent ES 2.100.363 teaches a device converting the energy of an oscillating water head or column by making use of a turbine of a particular design for the generation of mechanical power.

The published European application EP 1,108,890, teaches an aeolian energy generator applicable to motor vehicles. This generator is formed by plurality of rotating bodies provided with radial blades attached to a single transversal shaft, placed into a broad and flattened conduit lying longitudinally between the lateral wheels of the vehicle and under its body or coach-work. This transversal shaft is rotably mounted by means of bearings coplanar to the upper surface of this conduit in such a manner that the upper part of the rotating bodies with their corresponding blades are showing over the upper surface and facing an horizontal opening therein provided. When the motor vehicle begins its displacement or travel, it creates under its body an air current oriented backward by said conduit. The bodies lodged within said conduit provided with the blades begins to rotate, thereby rotating the axis of an electrical generator attached to their shaft, thus converting the mechanical energy into electrical energy.

Other pertinent documents worth to mention are U.S. Pat. No. 4,660,390; U.S. Pat. No. 4,892,138; U.S. Pat. No. 4,996,850; U.S. Pat. No. 5,512,788; U.S. Pat. No. 6,097,104; ES-2,000,521. These documents divulge diverse constructions of devices, apparatus or mechanisms capable of converting the energy contained in a fluid's flow into work or mechanical energy.

BRIEF DESCRIPTION OF THE DRAWINGS

FIG. 5 shows schematically a construction of this invention, employing a transmission pulley wheel as a coupling element to be connected to other driven means (not illustrated).

DETAILED DESCRIPTION OF THE DRAWINGS

Figure 1:
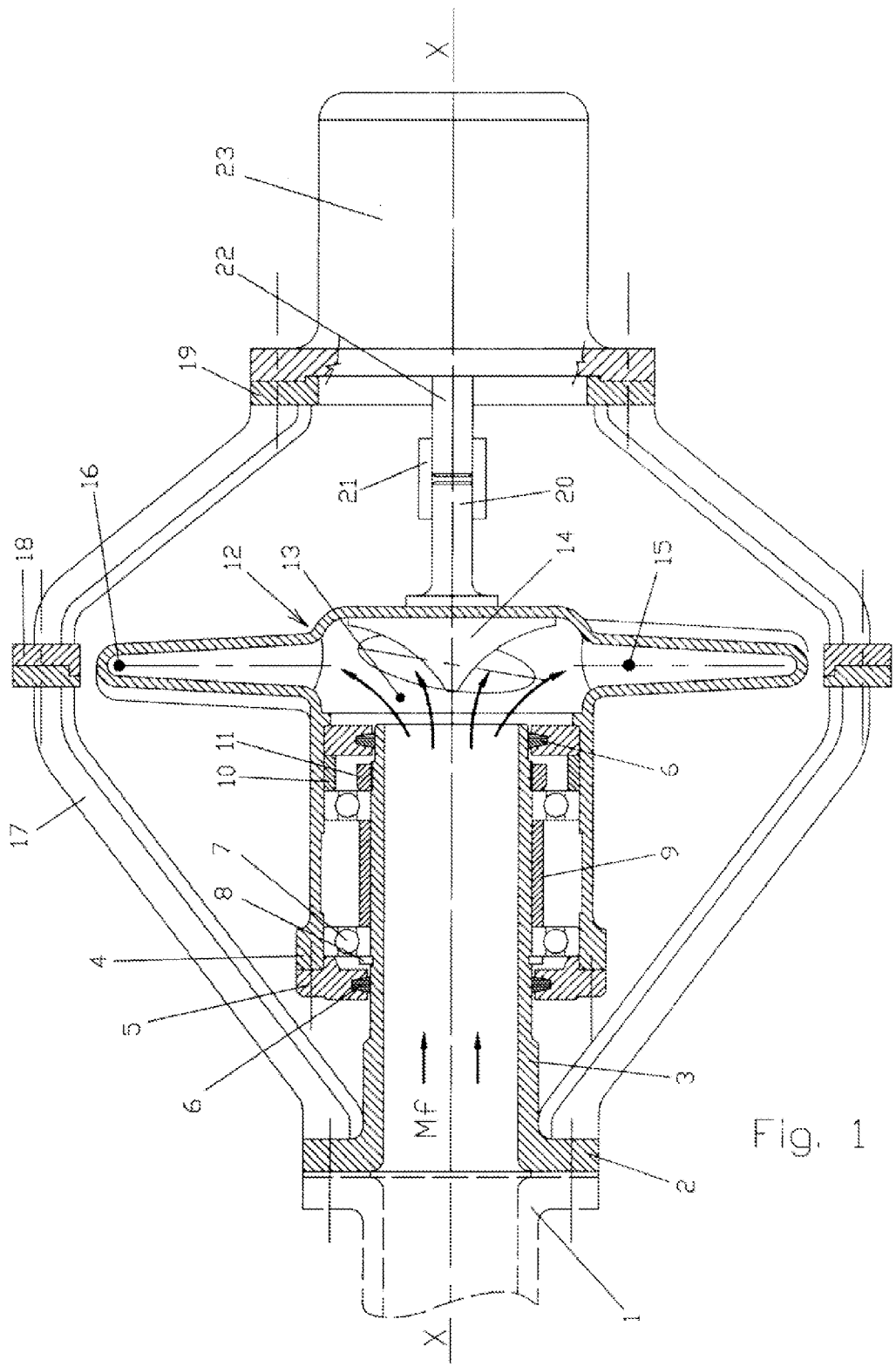
FIG. 1 shows a longitudinal cross section of the device of this invention along its geometrical axis (X-X).
Figure 2:
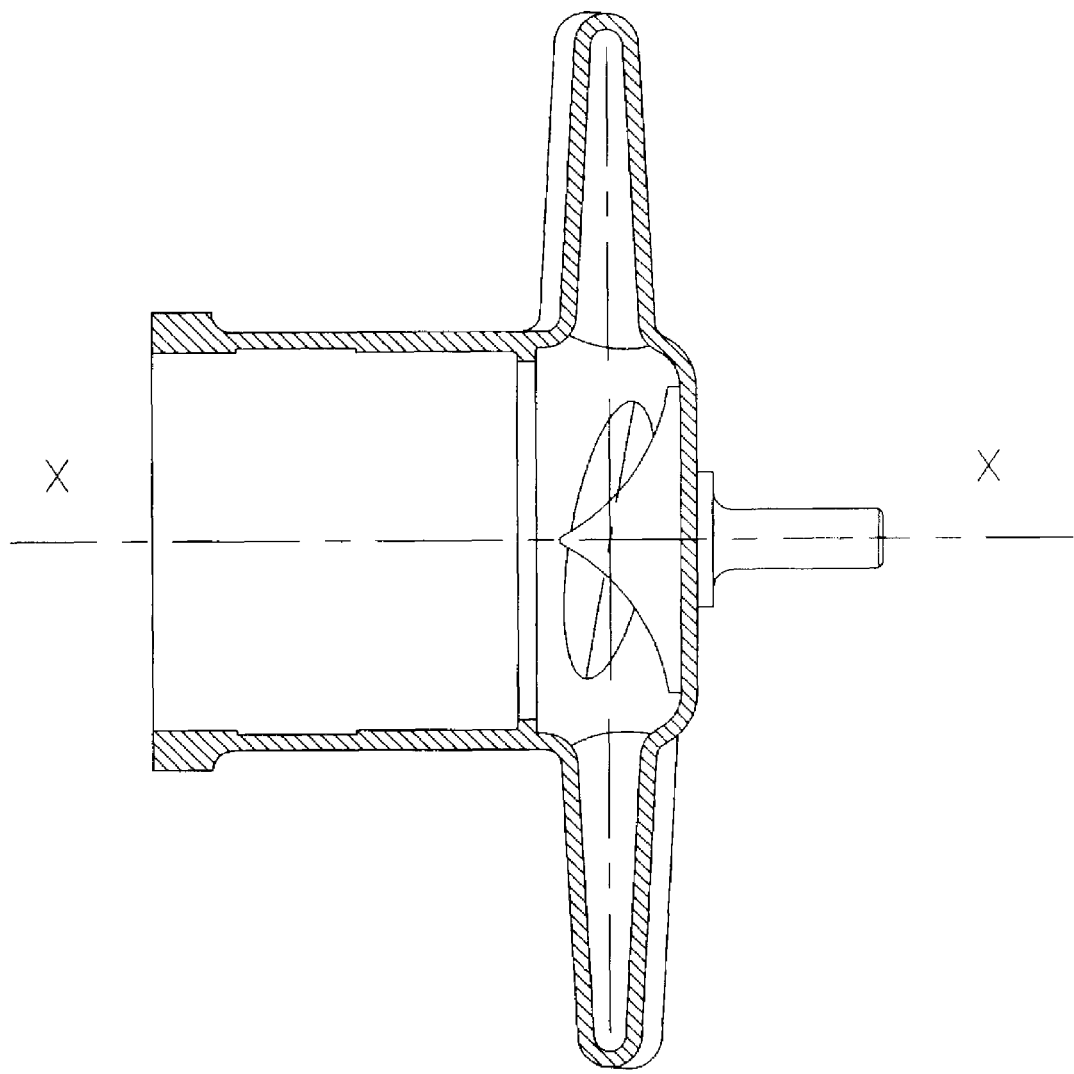
FIG. 2 depicts a schematic view of the longitudinal cross section of the movable part of the device of this invention, made of the conduit and an axial flow rotor.
Figure 4:
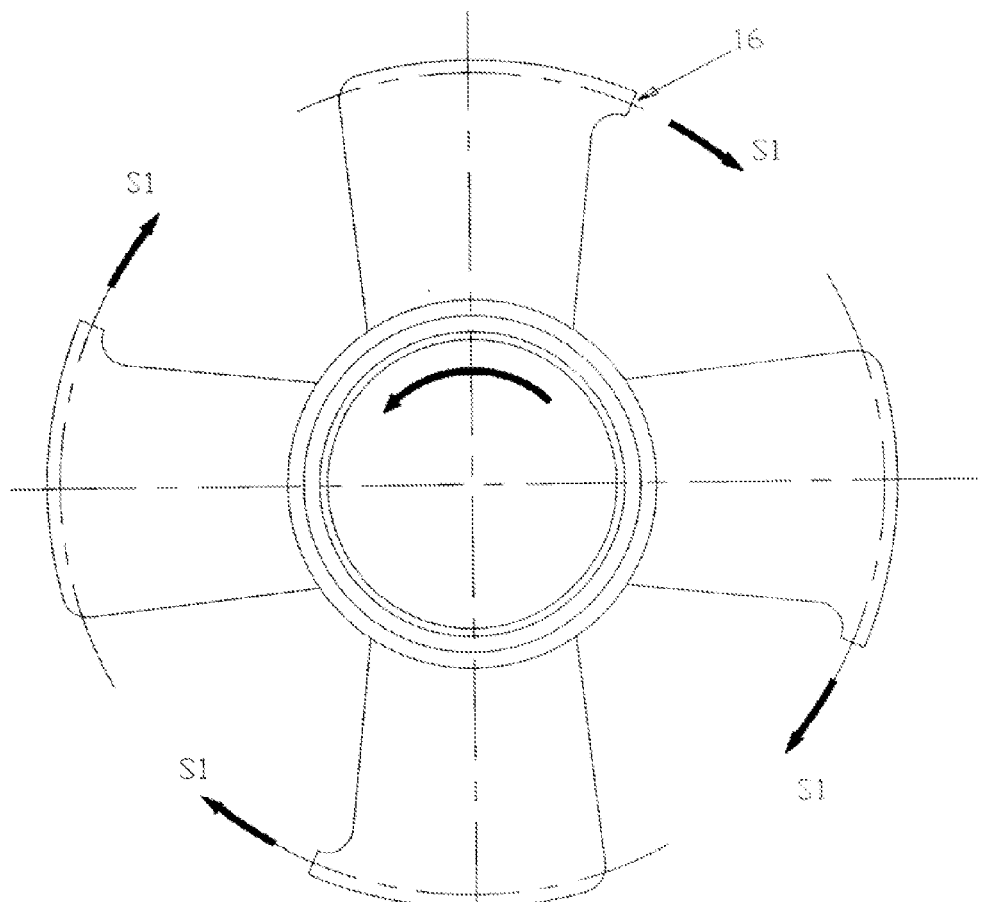
FIG. 4 illustrates a schematic view of the axial flow rotor as per FIGS. 2 and 3, viewed according to its rotating axis.
Figure 3:
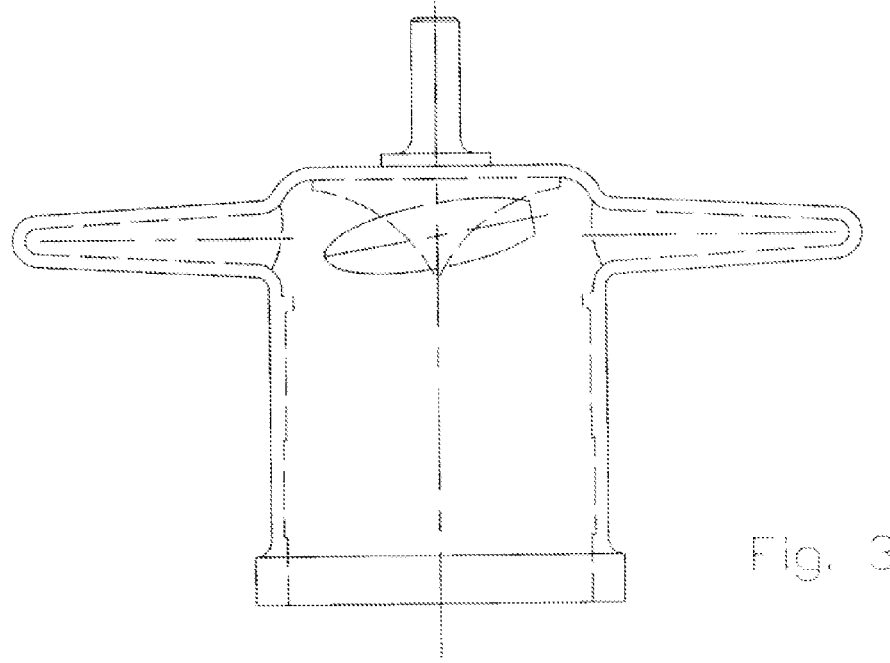
FIG. 3 shows a lateral schematic view of this movable part according to FIG. 2.

In FIGS. 1 to 5, it is reflected the main components which constitutes the device of this instant invention capable of transforming the energy contained with a flow of fluid, into mechanical energy, and they are:

1) Secondary outlet conduit for the fluid mass (either a gas fluid or a liquid fluid) and shown by interrupted lines
2) Connecting flange
3) Non movable fluid mass receptor main conduit
4) Movable conduit
5) Lid closing the movable conduit 4)
6) Sealing washers
7) Bearings
8) Fitting ring
9) Tubular spacing sleeve for the bearings
10) Spacer
11) Locking nut
12) Axial flow rotor
13) Rotor's hub
14) Deflector of fluid's flow
15) Rotor's blades of aerodynamic profile
16) Ejectors of fluid
17) Frame
18) and 19) Frame flanges
20) Driven axis, attached to rotor
21) Coupling
22) Driven shaft
23) Electrical generator
24) Pulley
25) Cotter
26) Fixing screws
X-X) Axial geometrical axis
Mf) Direction of fluid flow mass movement
S1) Outlet of fluid's flow In all these figures, the same reference numbers are indicating equal or equivalent components.

FIG. 1 shows a first embodiment of this invention. According to said Figure, the device of the invention comprises a fixed or non movable main conduit (3) axially aligned and attached to a secondary conduit (1) providing the input of the flow of the fluid into this device, being (3) coupled to (1) by means of the flange (2) cooperating with another similar flange belonging to said conduit (1), being both flanges abutting the one against the other and joined together by a series of fastening means well known in the art, such as screws, threaded pins, or the like. This conduit (1) is shown on FIG. 1 by means of dashed lines.

On this fixed or unmovable conduit (3) it is fitted a movable conduit (4), axially rotating on its same axis and sustained by means of bearings (7) placed on the outer surfaces of the fixed conduit (3) and retained in position through a ring (8), spacing sleeves (9) and locking nut (11). The above said means are axially secured in their intended positions by a lid (5) closing the annular space created between the unmovable conduit (3) and the movable conduit (4) with the aid of a spacing sleeve (9). The hermetic fitting of the movable conduit over the fixed conduit (3) is achieved by applying the watertight washers (6), which are pressing over the corresponding portions of the outer surfaces of (3).

It is further understood that the bearings, sleeves, washers and fittings of all these cooperating components may vary in kind within the known rules of the art, without altering the functions of these means, or their results.

The movable conduit (4) (see also FIG. 2) axially extends forming the axial flow rotor (12), which has at its center a hub (13) from which the plurality of aerodynamically profiled blades (15) extends at radius of equidistant angles. Inside this hub (13) there is a fluid flow deflector (14). The blades (15) are hollow and they have an inner passage communicating with the fixed conduit and at least one ejector means (16) practiced at the free end of each blade. This ejector placed at their corresponding free ends fluid outlets equally oriented forms the fluid's ejectors (16) (See FIG. 4) through which the turbine is made to turn.

From its operative point of view, the mass of fluid (Mf) issuing from the 15 its source conduit (1) and having a kinetic energy circulates and is received within the fixed conduit (3). Then it travels through the deflecting element (14) guiding the fluid's flow towards the hollow inside of the blades (15) and their corresponding fluid outlets or ejectors (16), with a radial direction (S1) for the best profit of the fluid's energy circulating through the rotor.

The driven axis (20) is attached axially oriented along the axis X-X to the hub (13) of the rotor, in cooperation with the energy receptor means as it will be down below explained.

This device according to this embodiment is completed by a supporting frame (17). This frame (17) is assembled in parts thereof connected by intermediate flanges (18). This frame is attached at one end thereof to the assembly flange (2) and at its opposite end it has another flange (19) on which it is attached the means recipient of the rotating energy (such as an electric generator 23) delivered by the rotor (15).

The construction of the frame can be made out of arms joining the flanges or by corresponding covers with outlet openings for the exhaust fluid or 10 a combination of arms and covers according to particulars of the design characteristics.

The driven axis (20) is attached to an axis (22) belonging to the energy recipient driven means such as an electric generator (23) through a coupling of reference (21). This coupling can be an elastic coupling, though this is not a restricting condition.

FIG. 5 shows a second constructive embodiment in which part or the whole of the supporting frame can be deleted and the driven means is a pulley (24) fixed by means of a cotter (25) and retention nut (26).

The rotor due to its construction provides an optimal use of the kinetic energy present in the fluid and is capable to perform even at low kinetic energy values and a reduced flow velocity.

According to all the above said and depicted, the advantages and construction embodiments of this invention for the converting the kinetic energy of a fluid into mechanical energy are easily understood, while the extend of amplitude of this instant invention is given by the following claims.

What is claimed is:

1. A device for converting kinetic energy contained in a fluid, into mechanical energy, coupled to an either gaseous or liquid fluid mass (Mf) outlet secondary conduit (1), characterized by being constituted by a fixed main conduit (3) receptor of said fluid mass and a movable conduit (4) coaxially fitted to said fixed conduit (3); this movable conduit (4) has attached to its free end an axial flow rotor (12) and associated to an outer supporting frame (17), including this assembly a flange (2) abutting with said fixed conduit (3), both conduits (3, 4) are assembled by a fitting device comprising a lid (5), sealing washers (6), bearings (7) and retaining ring (8) acting on spacing sleeves (9,10) and a locking nut (11); the movable conduit (4) attached to the rotor rotates along its axis and coaxial to said fixed conduit (3) without a major axial displacement; within said rotor (12) is lodged a hub (13) and a deflector (14) capable of directing the fluid's flow toward passages within the hollow blades (15) and their corresponding exits at the end of each blade, constituting each one of said exit outlets an ejector means (16) for the fluid (S1), thereby achieving the rotational movement of the rotor on its axis; attached to said rotor there is a driven shaft (20) with coupling means (21) to the shaft (22) of an electrical generator (23), said deflector (14) has a curved ascending profile capable of directing the fluid's flow towards the inner passage of the rotor's hollow blades, said supporting frame (17) is totally or partially absent and the driven shaft is profiled at its free end to receive a pulley wheel (24) therein fixed by means of a cotter (25) and retaining nuts (26).

2. A device for converting kinetic energy contained in a fluid, into mechanical energy, comprising:

A) a fixed main conduit that is axially aligned and attached to a secondary conduit to provide input of a flow of fluid, said fixed main conduit is coupled to said secondary conduit with a first flange of said fixed main conduit in cooperation with a second flange of said secondary conduit, said first and second flanges abut each other and are fastened;

B) on said fixed main conduit is fitted a movable conduit axially rotating on its axis and sustained by bearings placed on outer surfaces of said fixed main conduit and retained in position through a ring, spacing sleeves and locking nut, said ring, said spacing sleeves and said locking nut are axially secured in their intended positions by a lid that closes an annular space created between said fixed main conduit and said movable conduit with a spacing sleeve, a hermetic seal is formed between said movable conduit over said fixed main conduit with watertight washers that are pressed over exterior corresponding portions of said fixed main conduit; and C) said movable conduit axially extends to define an axial flow rotor, said axial flow rotor comprises a hub having a center from which a plurality of aerodynamically profiled blades extend therefrom at radiuses of equidistant angles, within said hub is a fluid flow deflector.

3. The device for converting kinetic energy contained in a fluid, into mechanical energy set forth in claim 2, further characterized in that said plurality of aerodynamically profiled blades are hollow, and each have an inner passage communicating with said fixed main conduit, and each have at least one respective ejector at an end.

4. The device for converting kinetic energy contained in a fluid, into mechanical energy set forth in claim 3, further characterized in that each said at least one respective ejector is equally oriented in a particular direction to cause said plurality of aerodynamically profiled blades to turn.

5. The device for converting kinetic energy contained in a fluid, into mechanical energy set forth in claim 4, further comprising a deflecting element to guide said flow of fluid into said plurality of aerodynamically profiled blades and out through its respective said at least one respective ejector.

6. The device for converting kinetic energy contained in a fluid, into mechanical energy set forth in claim 5, further comprising a driven axis that is attached axially oriented along an axis of said axial flow rotor.

7. The device for converting kinetic energy contained in a fluid, into mechanical energy set forth in claim 6, further comprising a supporting frame.

8. The device for converting kinetic energy contained in a fluid, into mechanical energy set forth in claim 7, further characterized in that said supporting frame is assembled in parts thereof connected by intermediate flanges.

9. The device for converting kinetic energy contained in a fluid, into mechanical energy set forth in claim 8, further characterized in that said supporting frame is attached at a first end to an assembly flange and at a second end to a flange.

10. The device for converting kinetic energy contained in a fluid, into mechanical energy set forth in claim 9, further characterized in that construction of said supporting frame is made out of arms joining said intermediate flanges.

11. The device for converting kinetic energy contained in a fluid, into mechanical energy set forth in claim 9, further characterized in that construction of said supporting frame is made out of corresponding covers with outlet openings for exhaust fluid.

12. The device for converting kinetic energy contained in a fluid, into mechanical energy set forth in claim 9, further characterized in that said driven axis is attached to an axis of an electric generator.

13. The device for converting kinetic energy contained in a fluid, into mechanical energy set forth in claim 12, further characterized in that said driven axis is attached to an axis of an electric generator through a coupling.

14. The device for converting kinetic energy contained in a fluid, into mechanical energy set forth in claim 13, further characterized in that said coupling is elastic.

15. The device for converting kinetic energy contained in a fluid, into mechanical energy set forth in claim 8, further comprising a pulley fixed by a cotter and retention nut.

* * * * *

UNITED STATES PATENT AND TRADEMARK OFFICE
CERTIFICATE OF CORRECTION

PATENT NO. : 7,722,313 B1 Page 1 of 1
APPLICATION NO. : 11/609737
DATED : May 25, 2010
INVENTOR(S) : Crescencio Di Iorio It is certified that error appears in the above-identified patent and that said Letters Patent is hereby corrected as shown below:

Title Page, Item (76) Inventors name should read --Crescencio Di Iorio--.

Signed and Sealed this

Twenty-ninth Day of June, 2010

David J. Kappos
*Director of the United States Patent and Trademark Office*